United States Patent
Gerresheim et al.

(10) Patent No.: US 6,986,373 B2
(45) Date of Patent: *Jan. 17, 2006

(54) AUTOMOBILE PNEUMATIC TIRES INCLUDING RUBBER REINFORCING PLIES WHICH TAKE ON A SUPPORTING FUNCTION WITH A DEFLATED TIRE

(75) Inventors: Manfred Gerresheim, Obertshausen-Hausen (DE); Karlheinz Baumann, Gelnhausen (DE); Günter Dietrich, Frankfurt (DE)

(73) Assignee: Dunlop GmbH, (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/752,403

(22) Filed: Jan. 6, 2004

(65) Prior Publication Data

US 2004/0140035 A1  Jul. 22, 2004

Related U.S. Application Data

(63) Continuation of application No. 09/806,706, filed on Aug. 7, 2001, now Pat. No. 6,688,357.

(30) Foreign Application Priority Data

Oct. 5, 1998  (DE)  ............................... 198 45 724

(51) Int. Cl.
*B60C 17/00* (2006.01)
*B60C 15/00* (2006.01)
*B60C 15/06* (2006.01)
*B60C 1/00* (2006.01)

(52) U.S. Cl. ..................... 152/517; 152/547; 152/550

(58) Field of Classification Search ................ 152/517, 152/547, 550
See application file for complete search history.

(56) References Cited

U.S. PATENT DOCUMENTS

| 5,511,599 | A | | 4/1996 | Willard, Jr. |
| 5,795,416 | A | * | 8/1998 | Willard et al. ............... 152/517 |
| 5,871,600 | A | * | 2/1999 | Oare et al. ............... 152/517 X |
| 6,230,773 | B1 | * | 5/2001 | Sandstrom et al. .......... 152/517 |
| 6,688,357 | B1 | * | 2/2004 | Gerresheim et al. ......... 152/517 |

FOREIGN PATENT DOCUMENTS

EP          0822105 A       2/1998

* cited by examiner

*Primary Examiner*—Adrienne C. Johnstone
(74) *Attorney, Agent, or Firm*—Fitch, Even, Tabin & Flannery

(57) ABSTRACT

An automobile pneumatic tire comprises a multiple-ply carcass extending in-between two bead rings having allocated bead fillers, a belt arrangement between the plies of the carcass and a tread strip, and rubber reinforcement plies in the sidewall sections assuming a supporting function where the tire is deflated. A first rubber reinforcement ply is inside a first ply of the carcass, a second rubber reinforcement ply is between the first ply of the carcass and the second ply of the carcass, and a third rubber reinforcement ply is between the second ply of the carcass and a third ply of the carcass. The three rubber reinforcement plies extend down with their ends staggered in relation to each other from the bead core area to the edge area of the belt ply. The three rubber plies have different heights in radial direction and different thickness over the height of the sidewall.

17 Claims, 3 Drawing Sheets

AUTOMOBILE PNEUMATIC TIRES INCLUDING RUBBER REINFORCING PLIES WHICH TAKE ON A SUPPORTING FUNCTION WITH A DEFLATED TIRE

This is a continuation of prior application No. Ser. 09/806,706, filed Aug. 7, 2001, now issued as U.S. Pat. No. 6,688,357 which is a 371 of PCT/EP99/07438, filed Oct. 5, 1999.

FIELD OF THE INVENTION

The invention relates to pneumatic vehicle tires.

BACKGROUND OF THE INVENTION

Pneumatic vehicle tires of this kind are, for example, known from U.S. Pat. No. 5,368,082. By means of such tires it is possible, in the event of a tire puncture, to travel larger distances at adequate speed, even with a deflated tire, before repair of the tire or a tire change has to be effected. Such tires accordingly increase the safety in the event of a tire puncture and make it possible to reach the next repair shop without problem, so that undesired and also dangerous tire changing on roads with heavy traffic can be avoided.

SUMMARY OF THE INVENTION

The object of the present invention is to design a pneumatic vehicle tire of the initially named kind so that even in the deflated state a long distance can be traveled at an adequately high speed, so that the stiffening rubber plies in the side walls do not disturbingly impair the driving comfort of the tire operated at normal pressure and so that the tire weight remains as low as possible.

This object is satisfied in accordance with the invention essentially in that a first rubber reinforcing ply is arranged radially inside a first carcass ply, a second rubber reinforcing ply is arranged between the first carcass ply and a second carcass ply, and a third rubber reinforcing ply is arranged between the second carcass ply and a third carcass ply; in that the three rubber reinforcing plies extend, starting from the bead apex region with mutually displaced ends, up to and beneath the edge region of the belt ply; in that the three rubber plies have a different height in the radial direction and different thicknesses over the height of the side wall; and in that, with a bead apex provided, the radially inner end regions of all three rubber plies are disposed on the axially inner side of the bead apex.

All three rubber reinforcing plies have different thicknesses over their radial height, with preferably the middle rubber reinforcing ply having a lower thickness in comparison to the inner and outer rubber reinforcing plies over at least a predominant part of the height of the side wall.

All rubber reinforcing plies and also the bead apex preferably consist of the same rubber mixture.

As a result of the choice of the rubber mixture, of the thickness profile of the rubber reinforcing plies and of the differing hardening times of these rubber reinforcing plies in dependence on the position of the rubber reinforcing plies in the tire, ideal values are obtained with respect to the long running characteristics with the deflated tire, in particular when, in the finished tire, the modulus of elasticity E* of the rubber reinforcing plies and also of the bead apex when measured at 70° C. is the same as or greater than 9 MPa, and the tans is equal to or smaller than 0.03 (measured by means of "EPLEXOR", 10 Hz, 10% prestress and 1% DSA) as a result of the mixtures that are used and the hardening time that is selected. The hardness IRHD of these rubber reinforcing plies and also of the bead apex should be equal to or greater than 80 when measured at room temperature. The measurement of the IRHD (International Rubber Hardness Degree) thereby takes place analogously to the Shore hardness measurement, but with a ball like measuring tip. The measurement or testing thereby takes place in accordance with DIN 53519, with the so-called microhardness being determined, since small samples are measured which are taken from the respective tire.

The rubber reinforcing plies and bead apex are preferably manufactured from a rubber mixture which consists of a polymer mix of NR/IR and BR, with at least 50 parts of NR/IR being contained in this polymer mixture, a carbon black content of 50 to 60 parts, preferably a rapidly sprayable FEF carbon black, as well as 5 to 8 parts of zinc oxide, 2 parts of stearic acid, 1.5 parts of aging protecting agent and also one or more parts of vulcanization accelerator and sulfur (preferably 4 to 5 parts) in order to keep the loss characteristics of the mixture low.

An advantageous embodiment is characterized in that all rubber reinforcing plies taper to a tip at their free ends in cross-section.

Accordingly, in one preferred form there is provided a pneumatic vehicle tire comprising a multi-ply carcass, which extends between two bead cores having associated bead apexes, a belt arrangement provided between the carcass plies and a tread strip and also rubber reinforcing plies arranged in the side wall regions, which take on a supporting function with a deflated tire, wherein a first rubber reinforcing ply is arranged radially inside a first carcass ply, a second rubber reinforcing ply is arranged between the first carcass ply and a second carcass ply, a third rubber reinforcing ply is arranged between the second carcass ply and a third carcass ply, and the three rubber plies have a different height in the radial direction and different thicknesses over the height of the side wall; and wherein the radially inner end regions of the first rubber reinforcing ply and the second rubber reinforcing ply are disposed on the axially inner side of the bead apex, and the ends of the radially innermost, first, carcass ply are led around the respective bead core and are overlappingly connected to the respective end of the outer, third, carcass ply, and the middle carcass ply terminates axially inside the bead apex adjacent to the respective bead core, the tire characterized in that the three rubber reinforcing plies extend, starting from the bead apex region with mutually displaced ends up to and beneath the edge region of the belt arrangement; and the tire further characterized in that all rubber reinforcing plies and also the bead apex consist of the same rubber mixture whose complex modulus of elasticity (E*) of the rubber reinforcing plies and also of the bead apex is the same as or greater than 9 MPa and the tan δ is the same as or smaller than 0.03, measured at 70° C., 10 Hz, 10% prestress and 1% double strain amplitude (DSA).

In one form, all three rubber reinforcing plies have a different thickness over their height and the middle rubber reinforcing ply has a lesser thickness over an at least predominate part of the side wall height in comparison to the inner and outer rubber reinforcing plies.

In another form, the tread side ends of the rubber reinforcing plies terminate with an increasing distance from the central plane of the tire, starting from the radially innermost ply.

In another form, the radially inner end of the radially outer rubber reinforcing ply contacts the inner side of the bead apex.

In another form, the middle carcass ply is connected in a region lying above the bead core to the radially inner carcass ply.

In another form, the carcass plies consist of rayon.

In another form, the belt plies consist of Kevlar (aromatic polyamide) or steel and the belt is optionally stiffened by additional rubber between the belt plies.

In the event that the radially inner end of the outer rubber reinforcing ply is simultaneously formed as a bead apex, provision is made that, when measured in the region of the maximum bead thickness (side wall height W), the thickness of the inner rubber reinforcing ply is approximately 2.5 mm, the thickness of the middle rubber reinforcing ply is approximately 1.9 mm, and the thickness of the outer rubber reinforcing ply amounts to 6.9 mm, with a tolerance of +/−0.5 mm applying for all measured values.

Further advantageous embodiments of the invention are set forth in the subordinate claims and will also be explained in the description of the embodiments.

BRIEF DESCRIPTION OF THE DRAWINGS

The invention will be explained in more detail in the following with reference to embodiments and to the drawing, in which are shown.

DETAILED DESCRIPTION OF THE PREFERRED EMBODIMENTS

Figure 1:
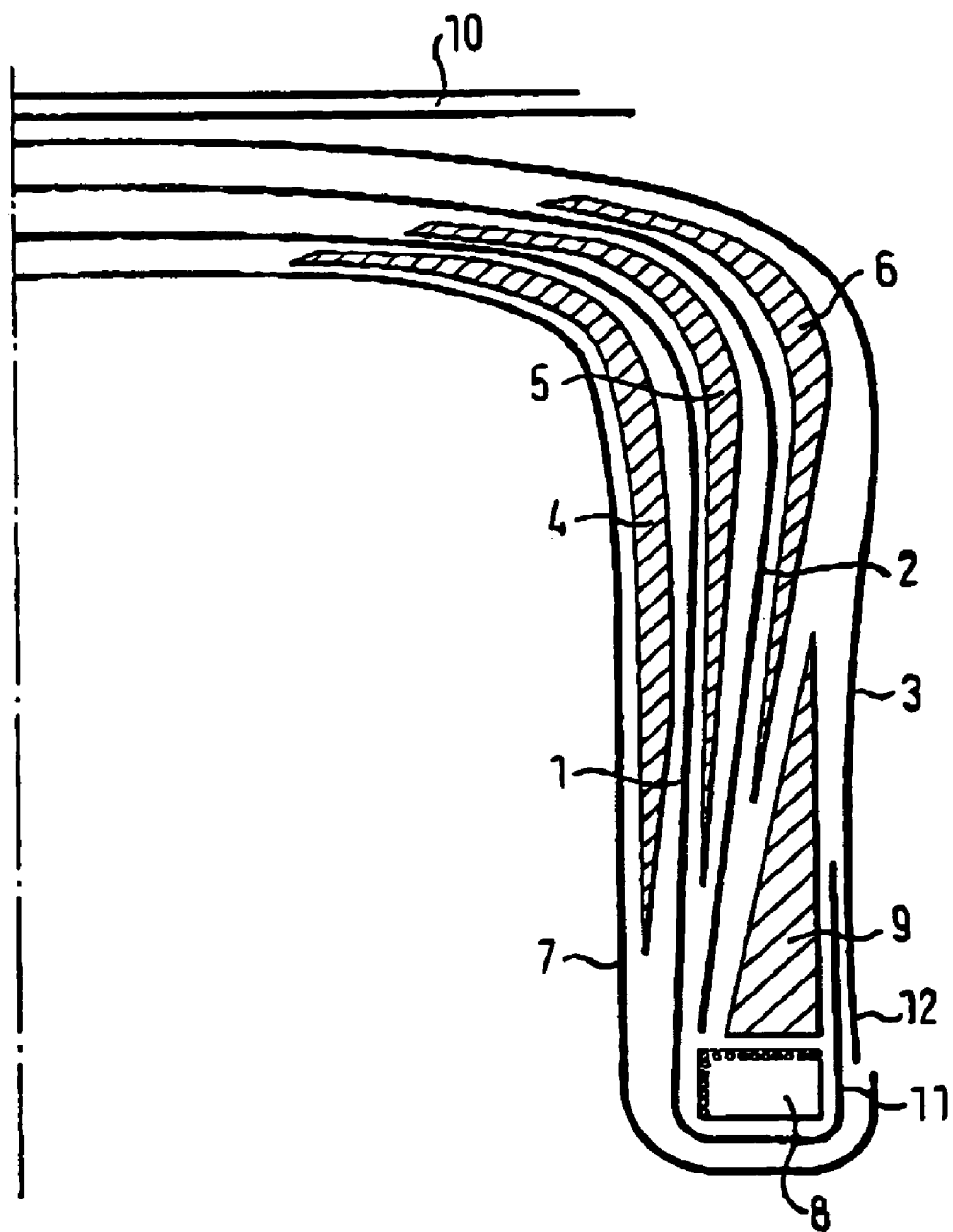
FIG. 1 a schematic axially sectioned representation of one half of a centrally symmetrical tire, FIG. 2 a schematic representation to explain the height and thickness dimensions of the rubber reinforcing plies used in the tire of FIG. 1, and FIG. 3 a sectional representation of one half of a tire in accordance with a preferred embodiment of the invention.

In accordance with FIG. 1 the tire has a three-ply carcass comprising an inner carcass ply 1, a middle carcass ply 2 and a radially outer carcass ply 3.

The inner carcass ply 1 is guided around the bead 8 and its end region 11 extends at the outer side up to at least half the height of the bead apex 9 and is connected to the radially outer carcass ply 3 while forming an overlapping zone.

The middle carcass ply 2 ends axially inside the bead apex 9 and extends approximately up to the bead 8.

A, first rubber reinforcing ply 4 is arranged radially inside the first carcass ply 1 and between this first carcass ply 1 and an inner rubber layer 7. A second rubber reinforcing ply 5 is located between the first carcass ply 1 and the middle carcass ply 2, while a third rubber reinforcing ply 6 is arranged between the middle carcass ply 2 and the outer carcass ply 3.

The design of the rubber reinforcing plies with respect to their radial height and their thickness profile over the height, on the one hand, and the mixture used for the rubber reinforcing plies, on the other hand, are of important significance for the running performance of the tire in the deflated state and also for its behavior in normal running.

All rubber reinforcing plies 4, 5, 6 have a different height and in each case a different thickness profile over their height.

The rubber reinforcing plies consist of a rubber mixture of mix of NR and/or IR and BR, as well as carbon black, zinc white, stearic acid, aging protection agent, softener, sulfur and accelerator. The reinforcing plies and bead apex are preferably manufactured from a rubber mixture comprising a polymer mix of NR/IR and BR, with at least 50 parts NR/IR, a carbon black content of 50 to 60 parts, 5 to 8 parts zinc oxide, 2 parts of stearic acid, 1.5 parts of aging protection agent and also at least one part of vulcanization accelerator and sulfur. Preferably 4 to 5 parts sulfur are used in order to keep the loss characteristics of the mixture low.

The rubber mixture intended for the rubber reinforcing plies and the bead apex must be hardened in such a manner that the rubber reinforcing plies have the following characteristics in the finished tire:

Hardness IRHD greater than or equal to 80, measured at room temperature, modulus of elasticity (MPa) greater than or equal to 9 MPa and tan δ smaller than or equal to 0.03, in each case measured at 70° C. and by means of "EPLEXOR", 10 Hz, 10% prestress, 1% DSA (Double Strain Amplitude).

The IRHD measurement (International Rubber Hardness Degree) takes place in accordance with the test method DIN 53519 sheet 2.

Figure 2:
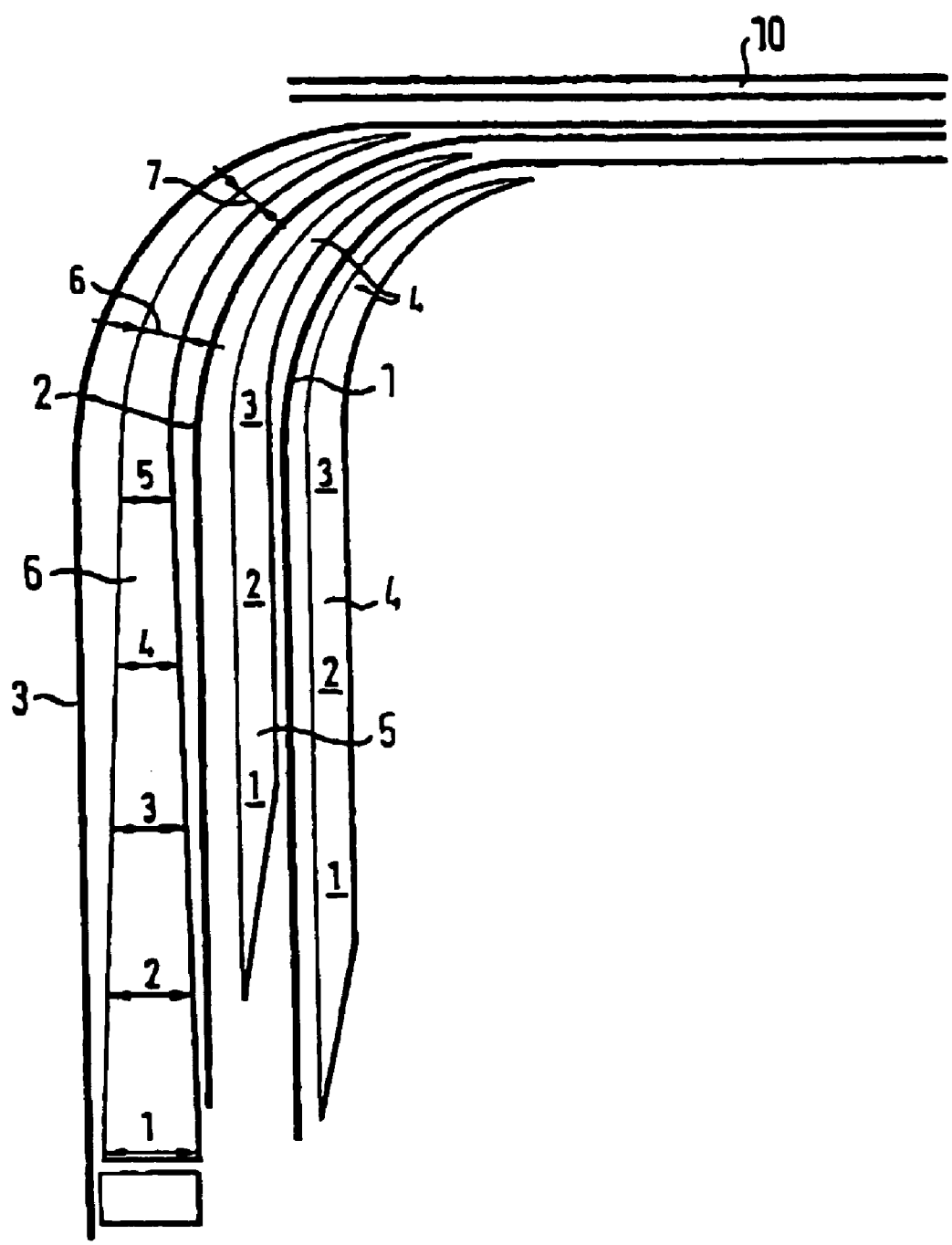

FIG. 2 shows a schematic representation to explain the length and thickness profile of the three rubber reinforcing plies of an embodiment, with the following table setting out the thickness profile relative to the height in millimeters for each of the strips alongside the value of the height.

|  | Height (mm) | Thickness 1 (mm) | 2 | 3 | 4 | 5 | 6 | 7 |
|---|---|---|---|---|---|---|---|---|
| Rubber ply 4 | 120 | 3.2 | 4.0 | 3.0 | 2.6 | — | — | — |
| Rubber ply 5 | 110 | 2.4 | 3.4 | 3.8 | 3.2 | — | — | — |
| Rubber ply 6 | 130 | 9.0 | 7.8 | 7.5 | 4.5 | 3.7 | 2.7 | 1.5 |

The tolerances amount in this respect to ±3 mm for the height and to ±0.3 mm for the thickness.

The positions 1 to 7 of the Table distributed over the side wall height can be found from FIG. 2.

Figure 3:
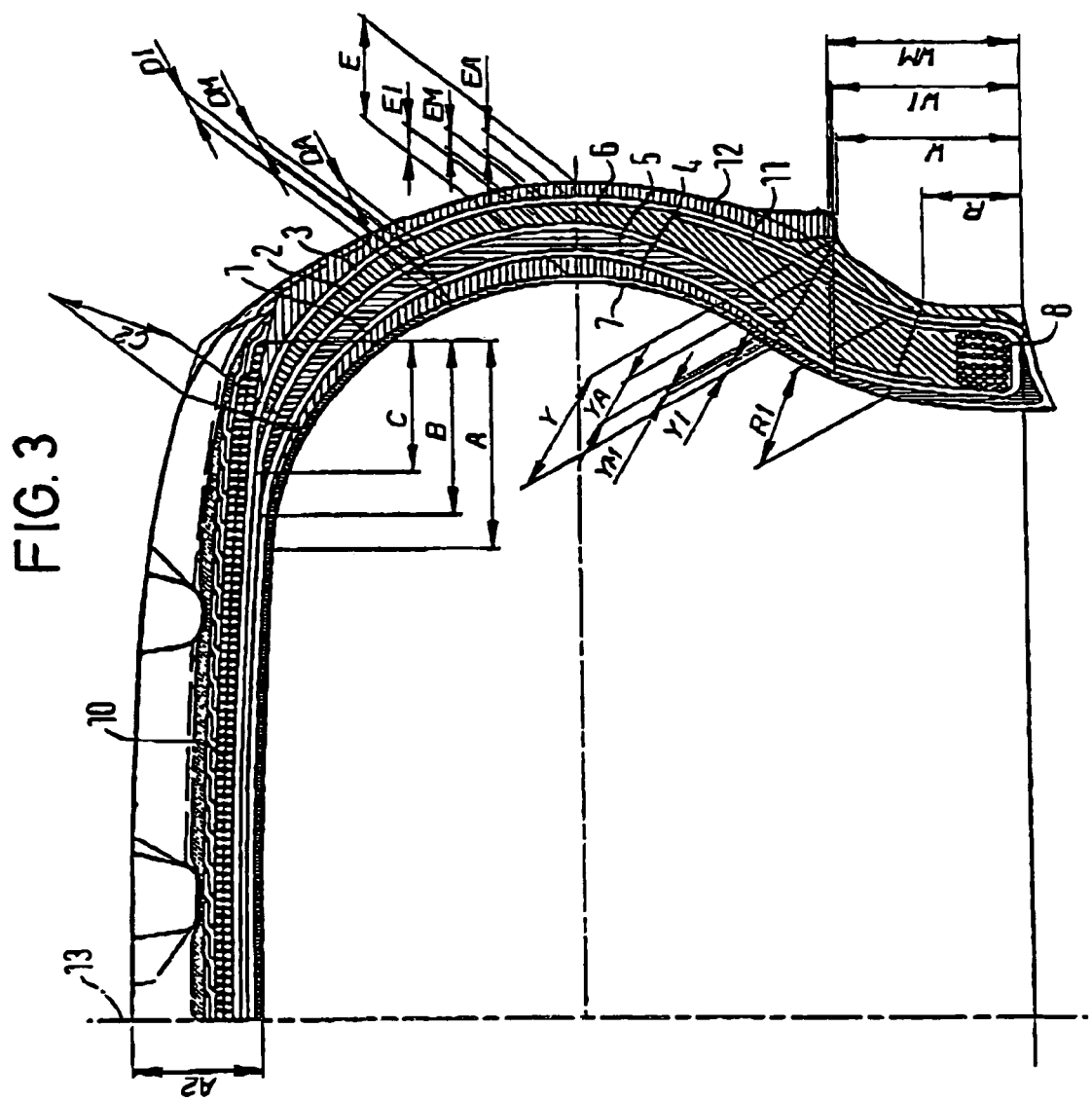

FIG. 3 shows a sectional representation of one half of a preferred embodiment of a pneumatic vehicle tire in accordance with the invention. The basic construction of this tire corresponds to the embodiment of FIG. 1, but in this case the outer rubber reinforcing ply 6 is integral with, i.e. formed in one piece with, the bead apex 9.

In FIG. 3 measurement positions are entered accurately, as a result of which the important thickness values and positions for the invention can be specified.

The tire thickness A2 at the center of the crown preferably amounts to 17.5±0.8 mm, whereas the tire thickness C2 at the shoulder amounts to 18.5±1.0 mm at the position shown. The thickness Y of the bead amounts to 20.0±1.5 mm at the position shown, whereas the bead thickness R1 amounts at the position shown, at the height of the dimension R, to 15.0±1.5 mm.

The measurement of the bead thickness Y takes place at the level of the dimension W entered in the drawing.

For the function of the pneumatic vehicle tire of the invention the belt side position of the ends of the rubber reinforcing plies 4, 5, 6 is also of importance. These rubber reinforcing plies extend beneath the belt 10 and also have different spacings with respect to the lateral belt end.

The corresponding distance A for the inner rubber reinforcing ply 4 amounts to 33.0±2.5 mm, the distance B for the central rubber reinforcing ply 5 amounts to 22.0±2.5 mm and the distance C for the outer rubber reinforcing ply 6 amounts to 15.0±2.5 mm.

The rubber reinforcing plies 4, 5, 6 have over their radial height a characteristic thickness profile which can be seen from FIG. 3, which is characterized by the thickness values present in FIG. 3 at the measurement positions shown. At the measurement position D, which is disposed approximately at the level of ⅔ of the side wall height, the inner rubber reinforcing ply 4 has a thickness of 3.0±0.5 mm, the central rubber reinforcing ply 5 has a thickness of 2.8±0.5 mm and the outer rubber reinforcing ply 6 has a thickness of 2.9±0.5 mm.

At the measurement position E at half the side wall height, the thickness of the inner rubber reinforcing ply amounts to 3.2±0.5 mm, the thickness of the middle rubber reinforcing ply 5 amounts to 2.9±0.5 mm and the thickness of the outer rubber reinforcing ply 6 amounts to 3.3±0.5 mm.

At the measurement position Y the inner rubber reinforcing ply 4 has a thickness of 2.5±0.5 mm in the plane shown, the middle rubber reinforcing ply 5 has a thickness of 1.9±0.5 mm and the outer rubber reinforcing ply, which is simultaneously formed as the bead apex, has a thickness at this point f 6.9±0.5 mm.

The thicknesses of the rubber reinforcing plies 4, 5, 6 change continuously between the values quoted with respect to the defined measurement positions.

It should also be mentioned that the distance between the steel belt and the aramid belt is increased by approximately 0.4 mm in comparison to a standard tire, in order to thereby achieve a further reduction of the bending deflection in the deflated state as a result of the thereby increased rubber component.

What is claimed is:

1. A pneumatic vehicle tire comprising a multi-ply carcass, which extends between two bead cores having associated bead apexes, an arrangement of belt plies provided between the carcass plies and a tread strip and also rubber reinforcing plies arranged in the side wall regions, which take on a supporting function with a deflated tire, wherein a first rubber reinforcing ply is arranged radially inside a first carcass ply, a second rubber reinforcing ply is arranged between the first carcass ply and a second carcass ply, a third rubber reinforcing ply is arranged between the second carcass ply and a third carcass ply, and the three rubber plies have a different height in the radial direction and different thicknesses over the height of the side wall; and wherein the radially inner end regions of the first rubber reinforcing ply and the second rubber reinforcing ply are disposed on the axially inner side of the bead apex, and the ends of the radially innermost, first, carcass ply are led around the respective bead core and are overlappingly connected to the respective end of the outer, third, carcass ply, and the middle carcass ply terminates axially inside the bead apex adjacent to the respective bead core, the tire characterized in that the three rubber reinforcing plies extend, starting from the bead apex region with mutually displaced ends up to and beneath the edge region of the belt arrangement; and the tire further characterized in that all rubber reinforcing plies and also the bead apex consist of the same rubber mixture whose complex modulus of elasticity (E*) of the rubber reinforcing plies and also of the bead apex is the same as or greater than 9 MPa and the tan δ is the same as or smaller than 0.03, measured at 70° C., 10 Hz, 10% prestress and 1% double strain amplitude (DSA).

2. A pneumatic vehicle tire in accordance with claim 1, characterized in that all three rubber reinforcing plies have a different thickness over their height and the middle rubber reinforcing ply has a lesser thickness over an at least predominate part of the side wall height in comparison to the inner and outer rubber reinforcing plies.

3. A pneumatic vehicle tire in accordance with claim 1, characterized in that the tread side ends of the rubber reinforcing plies terminate with an increasing distance from the central plane of the tire, starting from the radially innermost ply.

4. A pneumatic vehicle tire in accordance with claim 1, characterized in that the radially inner end of the radially outer rubber reinforcing ply contacts the inner side of the bead apex.

5. A pneumatic vehicle tire comprising a multi-ply carcass, which extends between two bead cores having associated bead apexes, an arrangement of belt plies provided between the carcass plies and a tread strip and also rubber reinforcing plies arranged in the side wall regions, which take on a supporting function with a deflated tire, wherein a first rubber reinforcing ply is arranged radially inside a first carcass ply, a second rubber reinforcing ply is arranged between the first carcass ply and a second carcass ply, a third rubber reinforcing ply is arranged between the second carcass ply and a third carcass ply, and the three rubber plies have a different height in the radial direction and different thicknesses over the height of the side wall; and wherein the radially inner end regions of the first rubber reinforcing ply and the second rubber reinforcing ply are disposed on the axially inner side of the bead apex, and the ends of the radially innermost, first, carcass ply are led around the respective bead core and are overlappingly connected to the respective end of the outer, third, carcass ply, and the middle carcass ply terminates axially inside the bead apex adjacent to the respective bead core, the tire characterized in that the three rubber reinforcing plies extend, starting from the bead apex region with mutually displaced ends up to and beneath the edge region of the belt arrangement; and the tire further characterized in that all rubber reinforcing plies and also the bead apex consist of the same rubber mixture whose complex modulus of elasticity (E*) of the rubber reinforcing plies and also of the bead apex is the same as or greater than 9 MPa and the tan δ is the same as or smaller than 0.03, measured at 70° C., 10 Hz, 10% prestress and 1% double strain amplitude (DSA), and the radially inner end of the outer rubber reinforcing ply is simultaneously formed as the bead apex.

6. A pneumatic vehicle tire in accordance with claim 5, characterized in that, when measured in the region of maximum bead thickness (side wall height W), the thickness of the inner rubber reinforcing ply amounts to approximately 2.5 mm, the thickness of the central rubber reinforcing ply amounts to approximately 1.9 mm and the thickness of the outer rubber reinforcing ply amounts to approximately 6.9 mm, with a tolerance of ±0.5 mm applying to all measured values.

7. A pneumatic vehicle tire in accordance with claim 1, characterized in that all rubber reinforcing plies are made so that they taper to a tip at their free ends in the cross-section.

8. A pneumatic vehicle tire in accordance with claim 1, characterized in that the middle carcass ply is connected in a region lying above the bead core to the radially inner carcass ply.

9. A pneumatic vehicle tire in accordance with claim 1, characterized in that the carcass plies consist of rayon.

10. A pneumatic vehicle tire in accordance with claim 1, characterized in that the belt plies consist of aromatic polyamide or steel.

11. A pneumatic vehicle tire in accordance with claim 10, characterized in that the belt is stiffened by additional rubber between the belt plies.

12. A pneumatic vehicle tire in accordance with claim 1, characterized in that the hardness IRHD of the rubber reinforcing plies and also of the bead apex are the same as or greater than 80 when measured at room temperature, with small samples taken from the tire being measured.

13. A pneumatic vehicle tire in accordance with claim 1, characterized in that at least the rubber reinforcing plies consist of a rubber mixture which is composed of a polymer mix of natural rubber (NR)/isoprene rubber (IR) and butadiene rubber (BR) with at least 50 parts NR/IR, a carbon black content of 50 to 60 parts, 5 to 8 parts zinc oxide, 2 parts stearic acid, 1.5 parts aging protection agent, and also at least 1 part of vulcanization accelerator and sulfur, all parts being parts by weight.

14. A pneumatic vehicle tire in accordance with claim 1, characterized in that the rubber reinforcing plies having a continuously changing thickness, have in total their greatest thickness in the region between the half side wall height and the upper third of the side wall height.

15. A pneumatic vehicle tire in accordance with claim 1, characterized in that, when measured at approximately two thirds of the side wall height and at the half side wall height, the thickness of the inner rubber reinforcing ply amounts to 3.0 mm and 3.2 mm respectively, the thickness of the middle rubber reinforcing ply amounts to 2.8 and 2.9 mm respectively, and the thickness of the outer rubber reinforcing ply amounts to 2.9 and 3.3 mm respectively, with a tolerance of ±0.5 mm applying to all measured values.

16. A pneumatic vehicle tire in accordance with claim 1, characterized in that, when related to the axially outer edge of the belt arrangement, the belt side end of the inner rubber reinforcing ply is spaced by 33 mm, the belt side end of the middle rubber reinforcing ply is spaced by 22 mm and the belt side end of the outer rubber reinforcing ply is spaced by 15 mm, with a tolerance of ±2.5 mm applying to these measured values.

17. A pneumatic vehicle tire in accordance with claim 1, characterized in that the crown thickness (A2) measured at the center of the tire is 17.5±0.8 mm and the tire thickness (C2) measured in the transition region of the shoulder and in the region of the ends of the rubber reinforcing plies amounts to 18.5±1.0 mm.

* * * * *